(12) United States Patent
Taylor

(10) Patent No.: US 9,867,497 B2
(45) Date of Patent: Jan. 16, 2018

(54) REUSABLE BOUQUET GARNI POUCH

(71) Applicant: Rene' Charles Taylor, Jackson, MS (US)

(72) Inventor: Rene' Charles Taylor, Jackson, MS (US)

( * ) Notice: Subject to any disclaimer, the term of this patent is extended or adjusted under 35 U.S.C. 154(b) by 0 days.

(21) Appl. No.: 14/806,559

(22) Filed: Jul. 22, 2015

(65) Prior Publication Data

US 2016/0100712 A1   Apr. 14, 2016

Related U.S. Application Data

(60) Provisional application No. 62/061,494, filed on Oct. 8, 2014.

(51) Int. Cl.
| | |
|---|---|
| *A22C 7/00* | (2006.01) |
| *A47J 36/20* | (2006.01) |
| *A23L 5/10* | (2016.01) |
| *A23L 27/10* | (2016.01) |

(52) U.S. Cl.
CPC ............ *A47J 36/20* (2013.01); *A23L 5/13* (2016.08); *A23L 27/10* (2016.08)

(58) Field of Classification Search
CPC .............. A23L 27/10; A23L 5/13; A47J 36/20
USPC ....... 426/106, 112, 113, 392, 410, 412, 665; 99/324, 426, 450
See application file for complete search history.

(56) References Cited

U.S. PATENT DOCUMENTS

| | | | | |
|---|---|---|---|---|
| 3,046,870 A | * | 7/1962 | Bork | A47J 37/0885 220/318 |
| 3,207,059 A | * | 9/1965 | Hirons | A47J 37/0694 16/373 |
| 4,507,116 A | * | 3/1985 | Leibinsohn | A61M 5/1483 128/DIG. 12 |

OTHER PUBLICATIONS

RSVP, "Stainless Steel Mesh Tea & Cooking Infuser", Date First Available on amazon.com: Sep. 27, 2006, amazon.com.*

* cited by examiner

*Primary Examiner* — Dana Ross
*Assistant Examiner* — Joseph Iskra
(74) *Attorney, Agent, or Firm* — René Charles Taylor

(57) ABSTRACT

A reusable bouquet garni and method of cooking with the same is provided. The reusable bouquet garni may include two pivotably connected pouch rims, moveable from an open configuration to a cooking configuration. A mesh material extends within the periphery formed by each pouch rim so that in the cooking configuration an ingredient enclosure is formed for securing seasoning ingredients therein. The pouch rims and mesh material are made of reusable, durable material. Each pouch rim may have cooperating fasteners for locking the two pouch rims in the cooking configuration.

1 Claim, 3 Drawing Sheets

REUSABLE BOUQUET GARNI POUCH

CROSS-REFERENCE TO RELATED APPLICATION

This application claims the benefit of priority of U.S. provisional application No. 62/061,494, filed 8, Oct. 2014, the contents of which are herein incorporated by reference.

BACKGROUND OF THE INVENTION

The present invention relates to cooking systems and, more particularly, to a cooking system that embodies a reusable bouquet garni and method of cooking with the same.

Traditionally, bouquet garni may be a bundle of herbs usually tied together with string or held within a sachet, and mainly used to prepare soup, stock and various stews. The bouquet garni is cooked with the other ingredients, but is removed prior to consumption. Current bouquet garni can burst because of their construction or become unfastened, whereby herbs or seasonings may escape into the sauces or soups.

As can be seen, there is a need for a reusable bouquet garni and method of cooking with the same so that it will burst or become unfasten during use.

SUMMARY OF THE INVENTION

In one aspect of the present invention, a reusable bouquet garni includes two pouch rims forming substantially identical openings; a stainless steel mesh material extending throughout each identical opening; a hinge connecting a portion of each pouch rim so that the reusable bouquet garni moves from an opening configuration to a cooking configuration forming an ingredient enclosure; and a first and a second fastener, each disposed along cooperating portions of each pouch rim for removably securing the cooking configuration.

In another aspect of the present invention, a reusable bouquet garni includes two pouch rims forming substantially identical openings, wherein each pouch rim has an inner edge and an outer edge; a mesh material extending throughout each identical opening, wherein each mesh material connects inward from the inner edge of its pouch rim; a hinge connecting a portion of each pouch rim so that the reusable bouquet garni moves from an opening configuration to a cooking configuration forming an ingredient enclosure; a first and a second fastener, each disposed along cooperating portions of each pouch rim for removably securing the cooking configuration; a hook disposed along a periphery of at least one pouch rim; and an elongated handle rod; and further comprising a hook clip disposed near an end of the elongated handle rod, wherein the hook clip is adapted to operatively engage the hook, wherein the mesh material and the pouch rims are made of stainless steel.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a reusable bouquet garni and method of cooking with the same so that it will not burst or become unfasten during use. The novel bouquet garni may include two pivotably connected pouch rims, moveable from an open configuration to a cooking configuration. A mesh material extends within the periphery formed by each pouch rim so that in the cooking configuration an ingredient enclosure is formed for securing seasoning ingredients therein. The pouch rims and mesh material are made of stainless steel material. Each pouch rim may have cooperating fasteners for locking the two pouch rims in the cooking configuration.

Referring to FIGS. 1 through 4, the present invention may include a reusable bouquet garni 30 having two pouch rims 10 pivotably connected so as to moveable to an opening configuration to a cooking configuration. Each pouch rim 10 may form a substantially identical predetermined shaped opening. The predetermined shaped opening may be any desired configuration, such as resembling a purse, so long as the configuration functions in accordance with the present invention as described herein.

Figure 1:
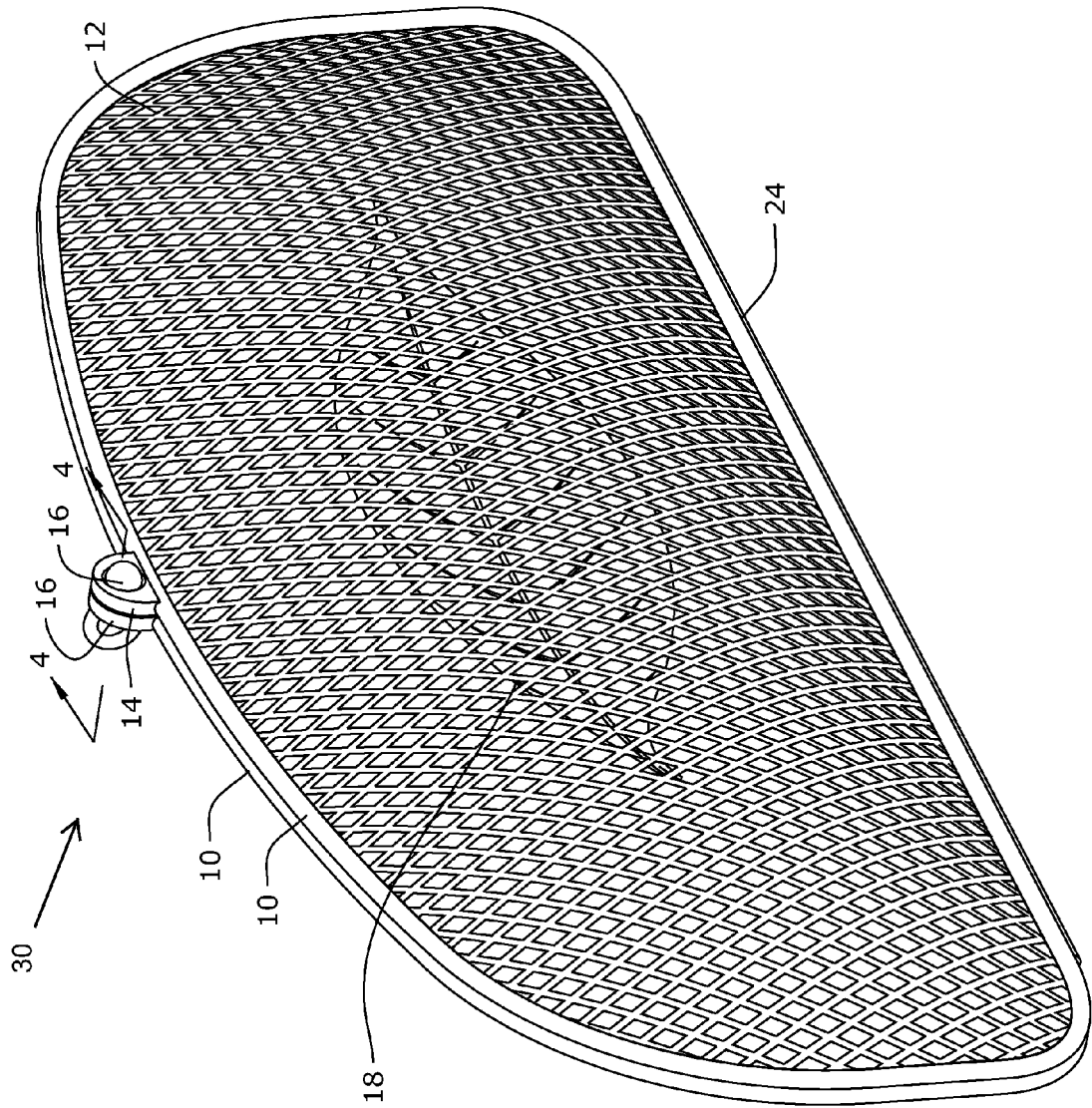
FIG. 1 is a perspective view of an exemplary embodiment of the present invention, shown in use in a cooking configuration.
Figure 2:
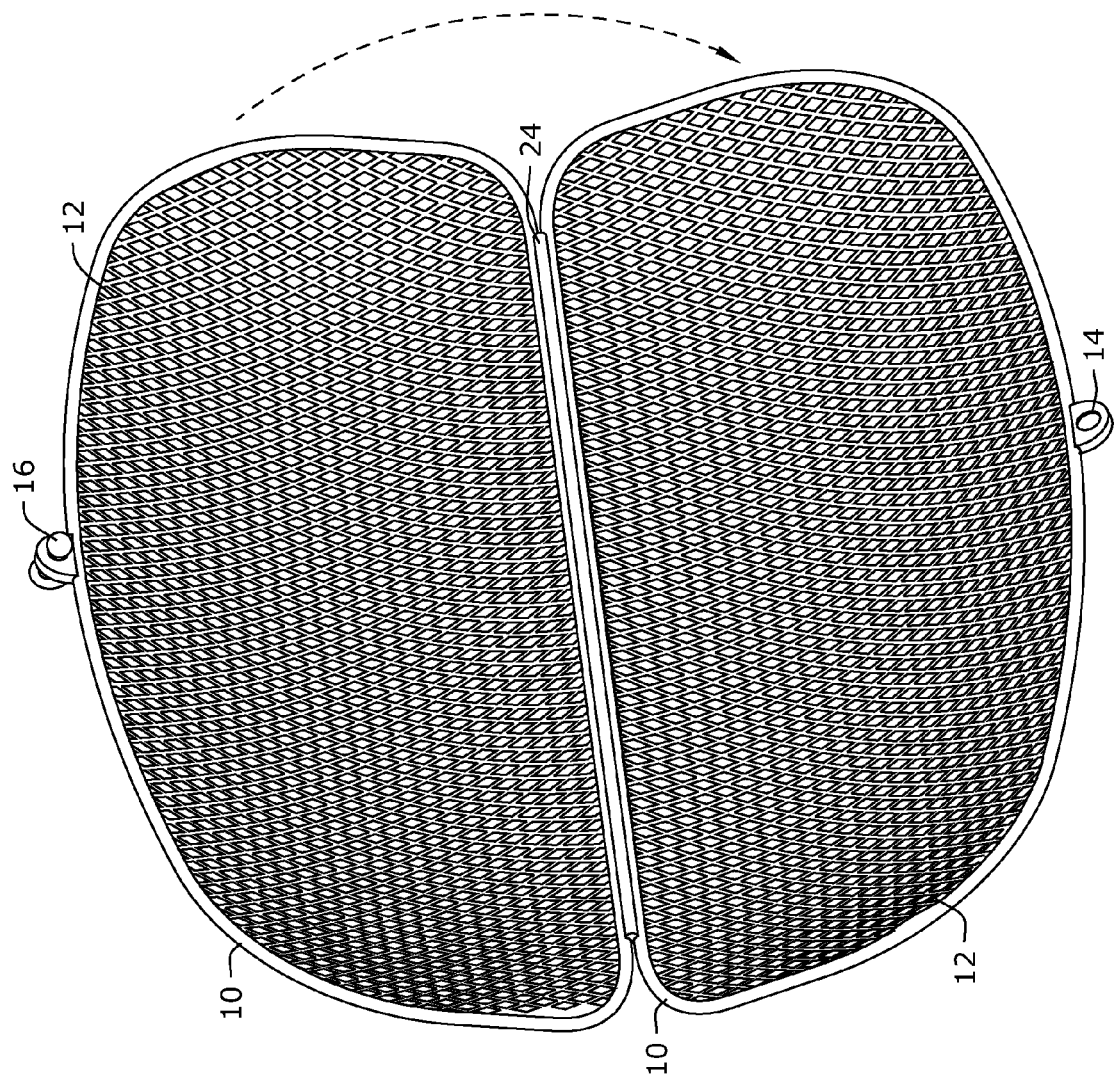
FIG. 2 is a perspective view of an exemplary embodiment of the present invention, demonstrating an open configuration.

A mesh material 12 may extend throughout the opening so that in the cooking configuration an ingredient enclosure is formed between the two mesh materials 12 so that at least one seasoning ingredient 18 may be housed therein, as illustrated in FIG. 1. The thickness of each pouch rim 10 may extend from an inner edge to an outer edge, wherein the inner edges contact each other in the cooking configuration. The thickness of each pouch rim 10 may exceed the thickness of the mesh material 12 so that the mesh material 12 may attach to each pouch rim 10 inward from its inner edge, further expanding the width of the resulting ingredient enclosure.

The mesh material 10 and each pouch rim 10 may be stainless steel or any suitable material so that the reusable bouquet garni 30 may be reused and durable.

Figure 4:
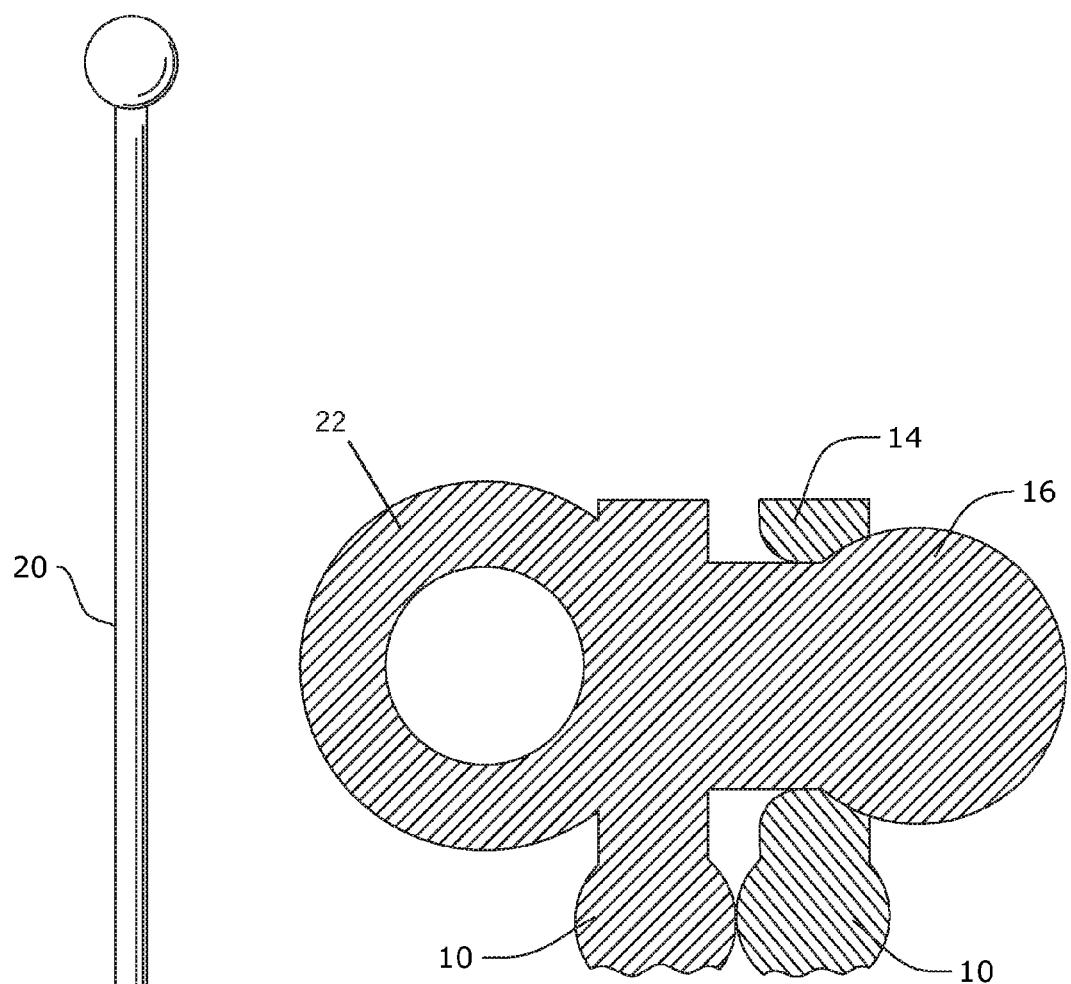
FIG. 4 is a section detail view of an exemplary embodiment of the present invention, taken along line 4-4 of FIG. 1.
Figure 3:
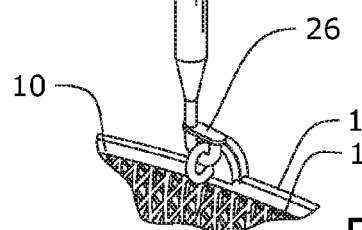
FIG. 3 is a perspective detail view of an exemplary embodiment of the present invention.

Each pouch rims may be connected by a hinge 24 along an engaged portion, forming the pivotable connection. Along cooperating portions of the two pouch rims 10 may be disposed a first and second fasteners 14, 16 so that in the cooking configuration, the two pouch rims 10 may be in locking engagement. It should be understood that the first and second fasteners 14, 16 may be any snap fastener known in the art for fastening or removably securing one object to another, as illustrated in FIG. 4. It should also be that the first and second fasteners 14, 16 may be configured in any array and/or number, so long as the first and second fasteners 14, 16 function in accordance with the present invention as described herein.

The reusable bouquet garni 30 may include an elongated handle rod 20 adapted to clip onto a hook 22 disposed along one of the two pouch rims 10. A hook clip 26 may be disposed on the end of the handle rod 20 for operatively engaging the hook 22.

A method of using the present invention may include the following. The reusable bouquet garni 30 disclosed above may be provided. A user may place at least one seasoning ingredient 18 against an inner portion of one mesh material 12 when the reusable bouquet garni 30 is in the open configuration. Then moving the reusable bouquet garni 30 to the cooking configuration so that the at least one seasoning ingredient 18 may be enclosed within the ingredient enclosure. Then the user may use the elongated handle rod 20 to operatively engage the hook 22 to lower the reusable bouquet garni 30 within a cooking medium.

During use, the cooking medium is allowed to pass through the mesh material 12 so as to take on a portion of the seasoning characteristics of the still enclosed at least one seasoning ingredient 18. The reusable bouquet garni 30 may be used for soups, sauces, frying, tea-making and the like.

Subsequent use, the user may engage the handle rod 20 to remove the reusable bouquet garni 30 from the cooking medium for reuse at a later time.

It should be understood, of course, that the foregoing relates to exemplary embodiments of the invention and that modifications may be made without departing from the spirit and scope of the invention as set forth in the following claims.

What is claimed is:

1. A reusable bouquet garni, comprising:

two pouch rims forming substantially identical openings, and each pouch rim having an inner edge and an outer edge, wherein the pouch rims are made of stainless steel;

a mesh material extending throughout each identical opening of said two pouch rims, and each mesh material connects inward from the inner edge of its respective pouch rim, wherein the mesh material is made of stainless steel;

a hinge connecting a portion of each pouch rim so that the reusable bouquet garni moves from an opening configuration to a cooking configuration forming an ingredient enclosure;

a first and a second snap fastener, each of said first and second snap fastener disposed along cooperating portions of each pouch rim for removably securing the cooking configuration, and said first fastener includes a receiving portion and said second fastener includes a head portion to engage said first fastener;

an annular hook disposed on a surface of the second fastener, wherein the annular hook extends in a direction away from the first fastener in the cooking configuration, and an elongated rigid handle rod separable from the reusable bouquet garni and including a hook clip disposed near an end of the elongated handle rod, wherein the hook clip operatively engages the annular hook.

* * * * *